June 26, 1928.                                                 1,674,729
J. LEDWINKA
DOORWAY AND POST STRUCTURE FOR AUTOMOBILE BODIES
Filed Sept. 18, 1924
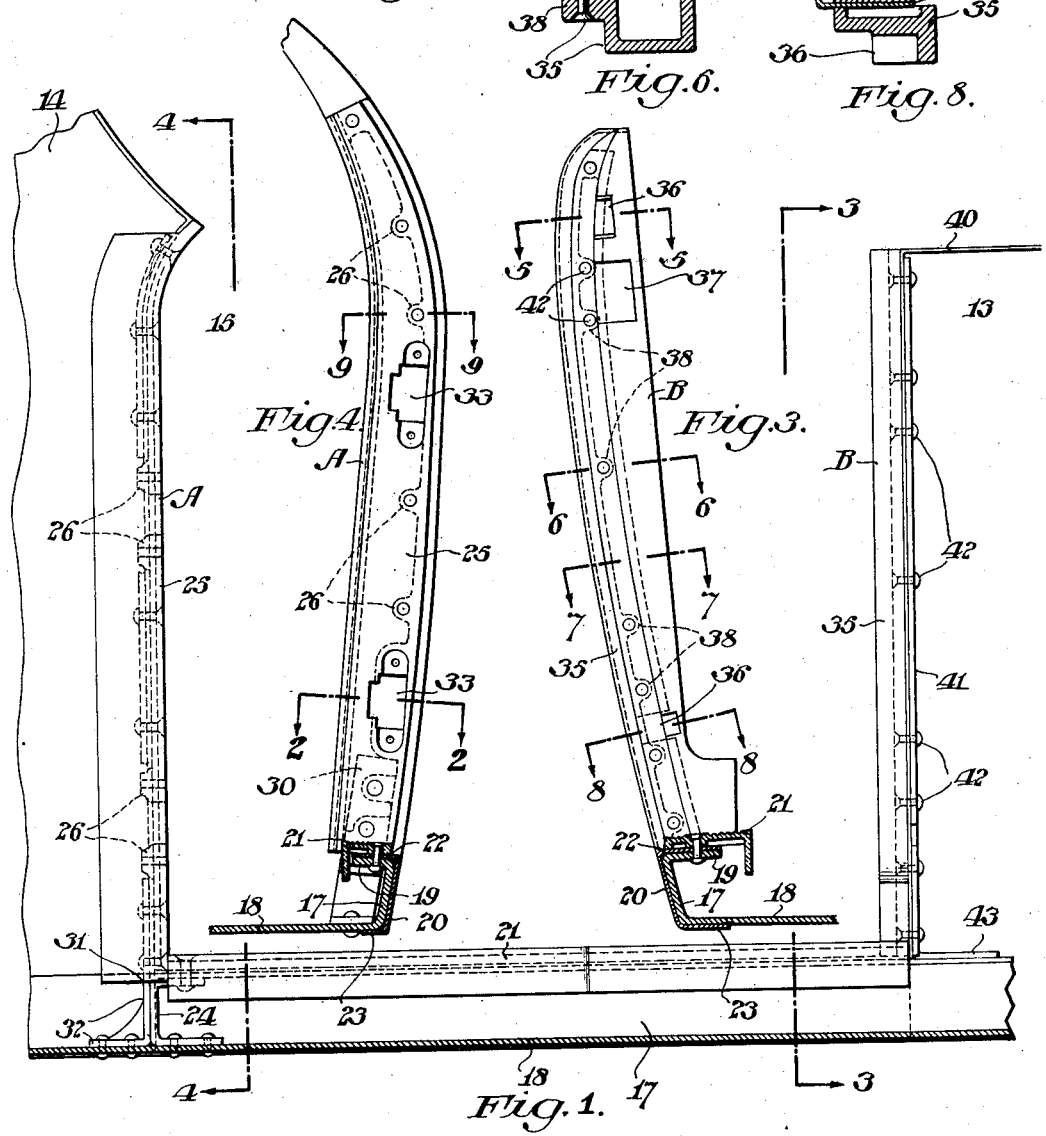
INVENTOR.
Joseph Ledwinka
BY
ATTORNEYS.

Patented June 26, 1928.

1,674,729

UNITED STATES PATENT OFFICE.

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

DOORWAY AND POST STRUCTURE FOR AUTOMOBILE BODIES.

Application filed September 18, 1924. Serial No. 738,346.

This invention relates to doorway and post structures for automobile bodies.

In the manufacture of all-metal, or other automobile bodies, the construction of the posts at the door openings, together with the manner of their connection to the other elements of the body, forms an important item for the consideration of body engineers.

These posts are connected to the body sills and, as a rule, form the vertical anchorages for the body paneling. It follows, therefore, that weaving of the body imposes upon the posts the burden of resisting the forces set up by the relative movements of the sills and paneling.

Also the posts, serving as the hinge posts for the doors, must support the weight of the doors hung thereon, while those posts constituting the door jambs must receive the shocks and jars incident to the opening and closing of the doors.

Another important consideration, in the construction and assembly of the posts upon the body, is the provision for locating and mounting thereon the door hinges, stops, buffers, latch keepers, and other similar accessories.

Accordingly, the desired post construction is one which is light but of great strength, which provides efficient means for the locating and mounting thereon of the accessories previously mentioned, and which lends itself to economical production.

The object of the invention is to provide a doorway and post structure for automobile bodies, which is strong, durable, economical to manufacture, light in weight, and constructed to withstand the strains and stresses of usage, and wherein provision for the location and mounting of the hinges, door stops or buffer retainers, latch bolt keepers, and the like, are provided in the post structure in uniform relation and spacing with respect to each other.

A further object of the invention is to provide a door-way and post structure for automobile bodies wherein displacement of the seats or hinges, door stops, buffer retainers, latch bolt keepers, and the like, by warping or opening of joints in the post is avoided.

Other objects of the invention will appear more fully hereinafter.

The invention contemplates the accomplishment of the foregoing objects by providing a one piece post construction having integrally formed therein the seats for the door post accessories, and by also providing simple yet effective means for securing the posts to the sills and the paneling to the posts.

In order that the carrying out of the invention will be facilitated, it is further contemplated to form the post of a single casting, or otherwise constructed.

In addition the invention consists substantially in the construction, combination, location, and relative arrangement of parts, all as will be more fully hereinafter set forth, as illustrated in the accompanying drawing and finally pointed out in the appended claims.

Referring to the accompanying drawing:

Fig. 1 is a broken view in vertical longitudinal section through a portion of the body showing an inside view of the front door opening and the A and B door posts, that is, the posts for the front door, at the right-hand side of the body.

Figs. 3 and 4 are broken, detail views in vertical section on the lines 3, 3, 4, 4, respectively, of Fig. 1, looking in the direction of the arrows, and showing the B and A posts, respectively, in elevation.

Figs. 5, 6, 7 and 8 are broken, detail views in transverse section, of the B post structure on the lines, respectively, 5, 5, 6, 6, 7, 7, 8, 8, of Fig. 3, looking in the direction of the arrows.

Figs. 2 and 9 are broken, detail views in section of the A post on the lines 2, 2, 9, 9, respectively, of Fig. 4, looking in the direction of the arrows.

In Fig. 1, I have shown an inside view of the A and B door post structures on the right-hand side of the body with the door opening, 15, between them. The body sill is indicated at 17, and may be of any desired structure. In the form shown, the sill, 17, is of channel shape, having the lower flange, 18, and the upper flange, 19. The shell or side panel, 20, at the door opening, 15, is shown as applied to the exterior surface of the sill, 17, and is flanged at its lower edge, as at 23, beneath the lower edge of the sill, and is flanged at its upper edge, as at 22, over the upper flange, 19, of the sill. A threshold strip, 21, in accordance with my invention, in the form of a casting of aluminum, generally angle shaped, in cross section, is fitted over the inturned flange, 22. The end of the threshold strip, 21, which terminates at the A post is supported by a bracket, 24, (see Fig. 1) which is in the form of a channel shaped stamping, the end of the threshold strip resting upon and being secured to the upper horizontal flange of said bracket, the lower horizontal flange of said bracket resting upon and being supported by the lower horizontal flange, 18, of the body sill, 17.

I will now describe the A post structure embodying my invention, particular reference being had to Figs. 1, 2, 4 and 9 This post consists of a casting, 25, preferably of aluminum, of generally angle shape in cross section. The upper end of this post member casting is tapered and curved to conform to the contour of the rear edge of the cowl. The post casting, 25, is formed with bosses, 26, on the inner face of one of its angle portions and the cowl stamping, 27, (see Fig. 9), is flanged inwardly, as shown at 28, which flange lies flatwise against the surfaces of the bosses, 26, and is rigidly secured in place thereagainst by rivets, bolts, welds, or otherwise, as indicated at 29. If desired, the flange 28, may be clamped against the bosses, 26, by means of a reinforcing strip, 30. The lower end of the post member or casting, 25, is rigidly connected to the body sill, 17. For this purpose, I have shown an angle bracket, 31, the end flange, 32, of which is riveted. bolted or otherwise secured to the lateral flange, 18, of the body sill, while the vertical portion of said bracket, 31, is bolted, riveted or otherwise rigidly secured to the lower portion of the post casting, 25.

Cast into the post member, 25, are seats and openings, indicated at 33, to receive the hinge plates, 34, of the front door.

By thus casting the door hinge plate seats and openings in the cast door post member, 25, it will be seen that uniform and exact spacing relation of the hinge plates for the door is insured and this relation remains constant and unaffected by the strains imposed upon the door in service, or by seams or joints in the body structure opening up or spreading. This also greatly facilitates the assembly of the doors in the body, thereby reducing the time and hence the cost of manufacture.

It will also be seen that the post structure described is exceedingly simple, and is composed of parts which can be easily constructed in standard forms, and quickly assembled. Moreover, the post structure is rendered very light in weight by reason of the few parts required in the structure thereof, and by reason of employing a cast aluminum member as one of the principal parts incorporated therein, while at the same time nothing of strength and rigidity is sacrificed in thus reducing the weight.

The B post structure is shown in Figs. 1, 3, 5, 6, 7 and 8, and consists of a casting, 35, preferably of aluminum, and in which is cast the seats, 36, which receive the door buffers. The seat or recess, 37, to receive the door latch bolt keeper is also formed in the casting, 35. Thus the proper and uniform spacing and relation of the door buffer and the latch bolt keeper are secure and maintained constant thereby greatly facilitating the assembly of the structure, and securing uniformity with relation to corresponding parts mounted on the A post structure. Moreover, the structure of the B post, as in the case of the A post, is composed of few parts which are simple and can be easily, quickly and economically manufactured and assembled, thereby greatly reducing the cost while at the same time securing lightness without sacrificing anything of strength. The post casting, 35, is formed with bosses, 38, against which the inturned edge flange, 39, of the front seat panel, 40, lies and is clamped by reinforcing strip, 41, said reinforcing strip, 41, panel flange, 39, and post casting being rigidly secured together by means of rivets, bolts or welds, as indicated at 42. The lower end of the post casting, 35, is rigidly secured to the body sill, and this may be accomplished in many different ways, as, for example, by bolting, riveting, or otherwise, as well as through the medium of the panel, 40, which latter, at its lower edge, is flanged and secured to the body sill. In addition, the lower end of the reinforcing strip, 41, is bent laterally, as shown at 43, (see Fig. 1) and is applied and secured by welding or otherwise to the upper flange, 19, of the body sill.

It will be readily seen that many variations and changes in the details may be made without departure from the spirit and scope of my invention. While, therefore, I have shown and described a specific structure as an embodiment of my invention, I am not to be limited or restricted to the exact details shown and described.

Having now set forth the objects and nature of my invention and a structure embodying the principles thereof, what I claim as new and useful, and of my own invention, and desire to secure by Letters Patent, is:

1. In a doorway and post structure for automobile bodies, the combination with a longitudinally extending body sill having an upper horizontal flange and a body panel applied to said sill and flanged over said sill flange, of an aluminum casting of angle shape fitted over and secured to said panel and sill flanges at the doorway of the body to form a threshold strip.

2. In a doorway and post structure for automobile bodies, the combination with a longitudinally extending body sill having an upper horizontal flange and a body panel applied to said sill and flanged over said sill flange, of an aluminum casting of angle shape fitted over and secured to said panel and sill flanges at the doorway of the body to form a threshold strip, and an angle bracket connecting the end of the threshold strip to the body sill.

3. In a door post structure, the combination with a body panel having a lateral edge flange, of a light metallic casting to form a door post, said casting having bosses formed thereon, said flange fitting against said bosses, and means to secure said flange to said bosses.

In testimony whereof, I hereunto affix my signature.

JOSEPH LEDWINKA.